(12) United States Patent
Lalor (10) Patent No.: US 6,830,014 B1
(45) Date of Patent: Dec. 14, 2004

(54) ANIMAL COLLAR (76) Inventor: Tom Lalor, 122 Garden Ave., North Vancouver, British Columbia (CA), V7P 3H2

( * ) Notice: Subject to any disclaimer, the term of this patent is extended or adjusted under 35 U.S.C. 154(b) by 0 days.

(21) Appl. No.: 10/634,467

(22) Filed: Aug. 5, 2003

(51) Int. Cl.$^7$ .......................... A01K 15/02; A62B 35/00
(52) U.S. Cl. ........................................ 119/859; 119/720
(58) Field of Search ................................. 119/859, 862, 119/718, 719, 720, 721

(56) References Cited

U.S. PATENT DOCUMENTS

| | | | |
|---|---|---|---|
| 4,762,088 A | * 8/1988 | Chapman et al. | 119/859 |
| 5,559,498 A | 9/1996 | Westrick et al. | 340/573 |
| 5,605,116 A | 2/1997 | Kim et al. | 119/720 |
| 5,636,597 A | 6/1997 | Van Curen et al. | 119/720 |
| 5,799,618 A | 9/1998 | Van Curen et al. | 119/721 |
| 5,911,198 A | 6/1999 | Van Curen et al. | 119/720 |
| 5,911,199 A | * 6/1999 | Farkas et al. | 119/859 |
| 5,913,284 A | 6/1999 | Van Curen et al. | 119/720 |
| 5,923,254 A | 7/1999 | Brune | 340/573.3 |
| 5,934,225 A | 8/1999 | Williams | 119/859 |
| D417,835 S | 12/1999 | Williams | D8/356 |
| 6,019,066 A | * 2/2000 | Taylor | 119/720 |
| 6,058,889 A | 5/2000 | Van Curen et al. | 119/721 |
| 6,073,589 A | 6/2000 | Van Curen et al. | 119/720 |
| 6,163,261 A | 12/2000 | Westrick | 340/573.3 |
| 6,184,790 B1 | 2/2001 | Gerig | 340/573.3 |
| 6,327,999 B1 | 12/2001 | Gerig | 119/712 |
| 6,360,697 B1 | 3/2002 | Williams | 119/720 |
| 6,431,122 B1 | 8/2002 | Westrick et al. | 119/721 |
| 6,459,378 B2 | 10/2002 | Gerig | 340/573.3 |
| 6,712,025 B2 | * 3/2004 | Peterson et al. | 119/721 |

* cited by examiner

*Primary Examiner*—Charles T. Jordan
*Assistant Examiner*—Elizabeth Shaw
(74) *Attorney, Agent, or Firm*—Andrus, Sceales, Starke & Sawall, LLP (57) ABSTRACT

An electronic animal collar designed to reduce the load applied to the animal's neck by one or more stimulating electrodes or sensors that extend from or through an inside surface of the collar housing into the skin of the animal during use, and to permit the collar to be securely fastened to the neck of the animal without risk of causing discomfort or damage to the skin of the animal due to pressure from the stimulating electrodes. The inside surface of the collar housing has one or more high point surfaces that are raised to extend the inside surface above the base of the stimulating electrodes or sensors toward the animal during use so as to increase contact between the inside surface and the animal's skin and to thereby relieve and distribute the load caused by collar tension around the animal's neck over a larger contact friction area.

18 Claims, 7 Drawing Sheets

PRESSURE POINTS

CONTACT FRICTION AREAS

ANIMAL COLLAR

FIELD OF THE INVENTION

The present invention relates to animal collars, and in particular to dog collars of the type that have one or more electrodes or sensors which protrude from the inside surface of the collar for contacting the neck of the animal and electronic devices located within the body of the collar to receive electronic control signals or sensor input and to generate a stimulus, which is transmitted to the animal through the electrodes or by a speaker on the collar.

BACKGROUND OF THE INVENTION

Various electronic animal collar-type training aids are known for enabling an animal trainer to encourage or discourage certain behaviour in animals, such as dogs. The devices may be used to discourage barking or digging, or contain the animal within a defined area.

Figure 1:
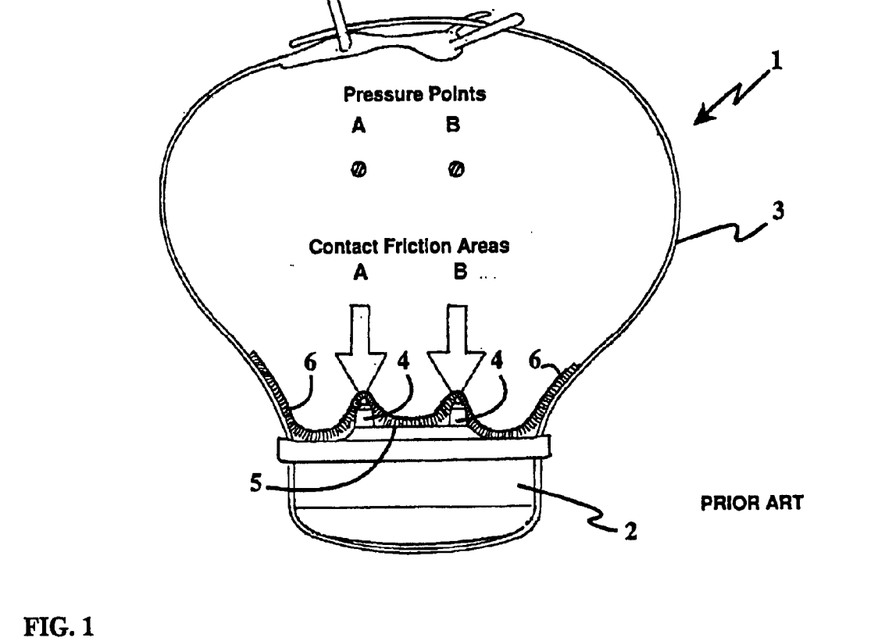
FIG. 1 shows a front side view of an electronic animal collar of the prior art.

Generally, the trainer uses a transmitter capable of sending electronic signals, such as radio frequency (RF) signals, to a receiver unit contained within a boxlike enclosure strapped around the animal's neck (see FIG. 1—Prior Art). The transmitter unit may be a stationary boundary unit, a stationary centrally located unit, or a portable transmitter carried by the trainer as part of a remote control unit. Also contained within the boxlike enclosure strapped to the animal are a power supply and a signal generator for generating a stimulus (normally an electric stimulus) that is transmitted to the animal through one or more electrodes, which protrude from the inside surface of the boxlike enclosure and press into the neck of the animal. In response to signals received by the receiver from the transmitter, a voltage is applied to the one or more electrodes to provide an electric stimulation to the animal when it exhibits undesirable behaviour. A device of this type is shown in FIG. 1 of the present application and is also shown and described in U.S. Pat. No. 6,327,999, issued to Duane A. Gerig on Dec. 11, 2002.

Figure 2:
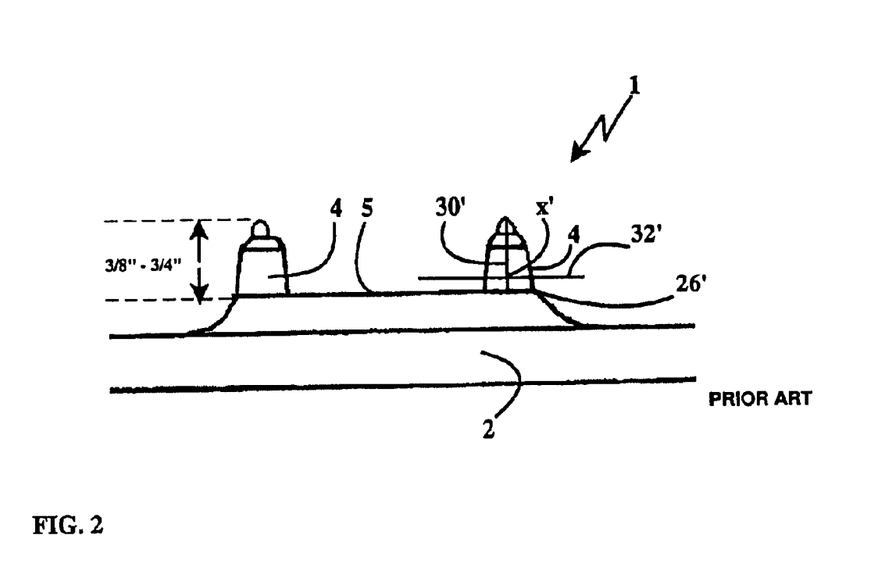
FIG. 2 shows an enlarged front side view of the electrodes and inside surface of the electronic animal collar of the prior art shown in FIG 1.

As shown in FIGS. 1 and 2, currently available animal collars 1 generally comprise a boxlike collar housing 2 attachable to the animal's neck using strap 3. One or more electrodes 4 typically protrude from an inside surface 5 of boxlike collar housing 2 between ⅜ inch (0.95 cm) and ¾ inch (1.9 cm). Electrodes 4 generally have contact points approximately ⅛ inch (0.32 cm) in diameter. One problem with such collars, is that their effectiveness is limited by the amount of contact that can be obtained between electrodes 4 and the animal's skin 6. Getting the proper tension on the collar requires considerable experience and many inexperienced trainers over tighten or under tighten the devices around the animal's neck. The problem with the electronic collars of the prior art is that 90% of the collar tensioning load is concentrated on the tiny electrodes 4, which jab into the animal's neck. This causes animal discomfort, and over time, the electrodes can harm the animal by causing sores. If the collars are worn loosely, sufficient electrode-skin contact can be lost when the animal runs or shakes itself, especially when the animal becomes wet.

So called 'no-bark collars' of the prior art are similar to the electronic collars described above, and shown in FIGS. 1 and 2, except, in place of the receiver/transmitter combination, no-bark collars have a bark sensor generally located on inside surface 5. The bark sensor is similar to the one or more electrodes 4 and is designed to contact the animal's neck and detect vibrations associated with barking. When such vibrations are detected, an electric stimulus is transmitted to the animal through the one or more electrodes 4 to deter the barking behaviour.

No-bark collars and other similar collars used in various animal containment systems or animal training systems, suffer from the same disadvantages described above.

It would therefore be advantageous if an electronic collar device was developed that could permit sufficient electrode-skin contact to allow the device be effective, and yet provide comfort to the animal and prevent damage and sores.

BRIEF SUMMARY OF THE INVENTION

It is an object of one aspect of the present invention to provide an animal collar that overcomes one or more of the above shortcomings.

It is an object of another aspect of the present invention to provide an animal collar that reduces and distributes the tensioning load applied to the animal's neck by the stimulating electrodes or sensors.

It is an object of another aspect of the present invention to provide an animal collar that can be securely fastened to the neck of the animal and that reduces the risk of causing discomfort or damage to the skin of the animal due to pressure from the stimulating electrodes or sensors.

Briefly, the present invention provides an electronic animal collar designed to reduce the load applied to the animal's neck by one or more stimulating electrodes or sensors that extend from or through an inside surface of the collar housing into the skin of the animal during use, and to permit the collar to be securely fastened to the neck of the animal without risk of causing discomfort or damage to the skin of the animal due to pressure from the stimulating electrodes. The inside surface of the collar housing has one or more high point surfaces that extend the inside surface above the electrode base and towards the animal so as to relieve and distribute the load caused by collar tension around the animal's neck over a larger contact friction area. The high point surfaces intersect with a notional 90-degree plane extending from any point, located above the electrode or sensor base where it intersects with the inside surface of the collar housing, on a central longitudinal axis of any of the one or more electrodes or sensors.

According to one aspect of the present invention, there is provided an animal collar designed for attachment to an animal comprising: a collar housing having an inside surface directed toward the animal during use; at least one electrode intersecting the inside surface at an electrode base and extending toward the animal during use; the inside surface having at least one high point surface extending above the electrode based and toward the animal during use.

According to another aspect of the present invention, there is provided an animal collar designed for attachment to an animal having a stimulating unit for generating a stimulus, and one or more electrodes for transferring the stimulus to the animal, the collar comprising: a collar housing for containing the stimulating unit; the collar housing having an inside surface designed for contacting the skin of the animal during use, each of the one or more electrodes intersecting the inside surface at an electrode base and extending toward the animal during use; the inside surface having at least one high point surface extending above the electrode based and toward the animal during use.

According to a further aspect of the present invention, there is also provided an animal collar designed for attachment to an animal comprising: a collar housing having an inside surface designed for contacting the skin of the animal during use; and at least one electrode intersecting the inside surface at an electrode base, the at least one electrode having a central longitudinal axis extending toward the animal during use from the electrode base to an opposite distal end; the inside surface having at least one high point surface designed to intersect with a notional 90-degree plane extended from any point on the central longitudinal axis.

One advantage of the present invention is that it reduces the load applied to the animal's neck by the stimulating electrodes or bark sensor. A further advantage of the present invention is that it can be securely fastened to the neck of the animal without risk of causing discomfort or damage to the skin of the animal due to pressure from the stimulating electrodes or sensor.

Further objects and advantages of the present invention will be apparent from the following description, wherein various embodiments of the invention are clearly described and shown.

BRIEF DESCRIPTION OF THE DRAWINGS

In drawings that illustrate the present invention by way of example.

DETAILED DESCRIPTION OF THE INVENTION

FIG. 1 shows an electronic animal collar 1 common to the prior art and designed for attachment to the neck of an animal, such as a dog. Collar 1 typically has a boxlike collar housing 2 attachable by a connecting strap 3 to the neck of an animal, and supporting one or more electrodes or sensors 4 on a flat inside surface 5 thereof. Electrodes 4 make contact with the skin 6 of the animal at pressure points A and B when the collar 1 is attached to the animal's neck. Pressure points A and B also represent contact friction areas between the animal's skin 6 and collar housing 2. The boxlike collar housing 2 contains the necessary electronic components for the proper functioning of the collar, including for example, a receiving unit for receiving electronic control signals, such as RF signals, from a remote transmitter, a power supply, and a stimulating unit for generating an electric stimulus, which is delivered to the animal through electrodes 4 in response to the received electronic control signals. In an electronic no-bark collar of the prior art, a bark sensor, similar to the one or more electrodes 4, is used in place of the receiver/transmitter combination. The bark sensor detects vibrations due to barking and signals the stimulating unit to issue an electric stimulus to the animal through electrodes 4.

FIG. 2 is an enlargement of the one or more electrodes or sensors 4 shown in FIG. 1, illustrating that in the prior art the one or more electrodes or sensors 4 typically protrude above inside surface 5 between ⅜ inch (0.95 cm) and ¾ inch (1.9 cm).

Figure 3:
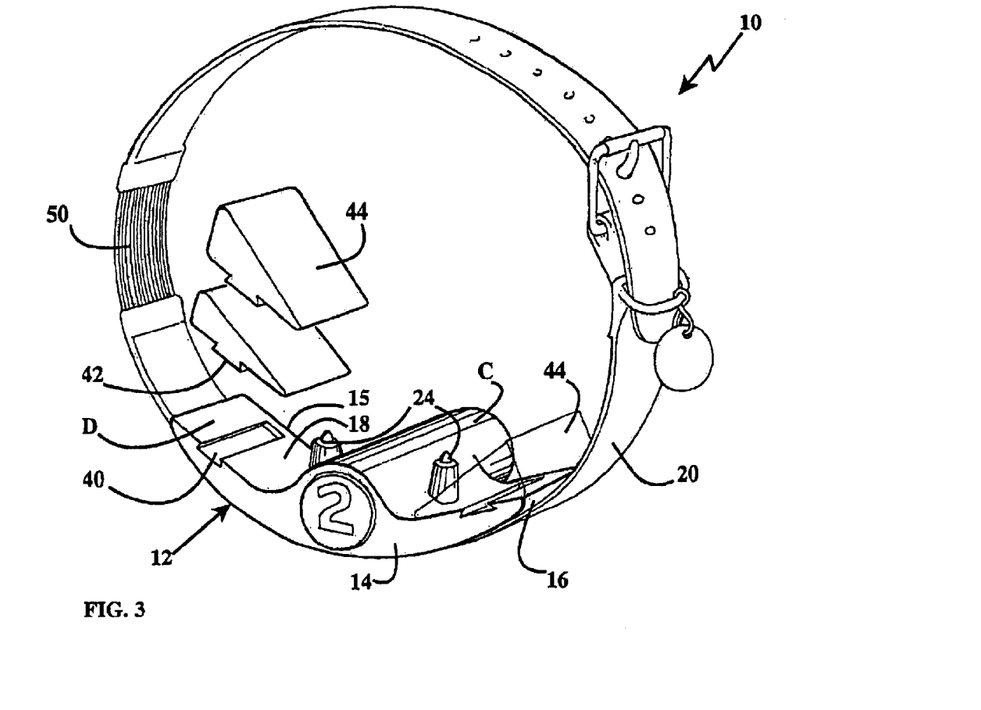
FIG. 3 is a perspective view of the animal collar of one embodiment of the present invention showing attachment to a connecting strap and the location of side inserts in exploded fashion.

FIGS. 3 through 9 illustrate one embodiment of an improved animal collar 10 of the present invention, which is designed for attachment to the neck of an animal, such as a dog, using a connecting strap 20 (see FIG. 3). As in the prior art collar 1 shown in FIGS. 1 and 2, collar 10 includes a collar housing 12 for containing a receiving unit 62 (see FIG. 10), a stimulating unit 72 (see FIG. 12), and a power supply (not shown). Depending on the various functions of collar 10, collar housing 12 may also contain other devices, such as an audio storage device 68 (see FIG. 12) and a collar speaker 60 (see FIGS. 6, and 10–14). If collar 10 is a no-bark collar, collar housing 12 may not contain receiving unit 62, but instead will include a bark sensor 90 (see FIG. 14).

Collar housing 12 of the present invention generally has a front surface 14, an opposing back surface 15, an outside surface 16, which faces away from the animal during use, and an inside surface 18, which faces inwards toward the animal and is designed for contacting the skin of the animal during use when the collar is attached to the animal's neck. Generally, collar housing 12 is contoured, as shown in FIG. 3, to fit the curvature of the animal's neck, but one skilled in the art will appreciate that other configurations are possible so long as the improved supporting high point surfaces C, D, and E, as described herein below, are included.

One or more electrodes or sensors 24 extend through or are supported on inside surface 18. For convenience, the present invention is generally shown having two electrodes 24, however, those skilled in the art will appreciate that more or fewer electrodes or sensors are possible. For example, a typical no-bark collar may have two electrodes 24 for delivering electric stimulation to the animal and one bark sensor 90 (see FIG. 14), for sensing vibrations generated by barking, extending through or supported on inside surface 18. In general, reference in this application to one or more electrodes shall include one or more sensors, such as bark sensors.

Figure 4:
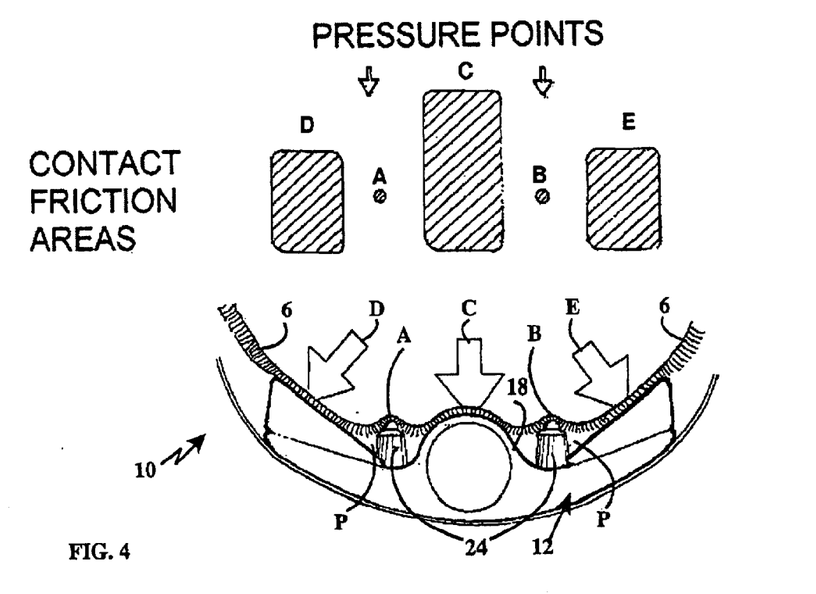
FIG. 4 is a front view of the collar of the present invention, with side inserts installed, showing the location of pressure points and contact friction areas with the skin of the animal.
Figure 5:
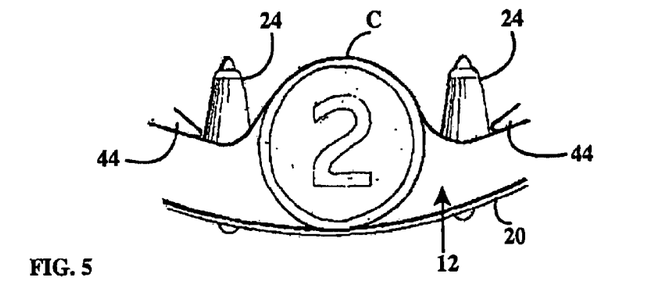
FIG. 5 is an enlarged front view of the electrodes and central high point surface of the collar shown in FIG. 4.
Figure 7:
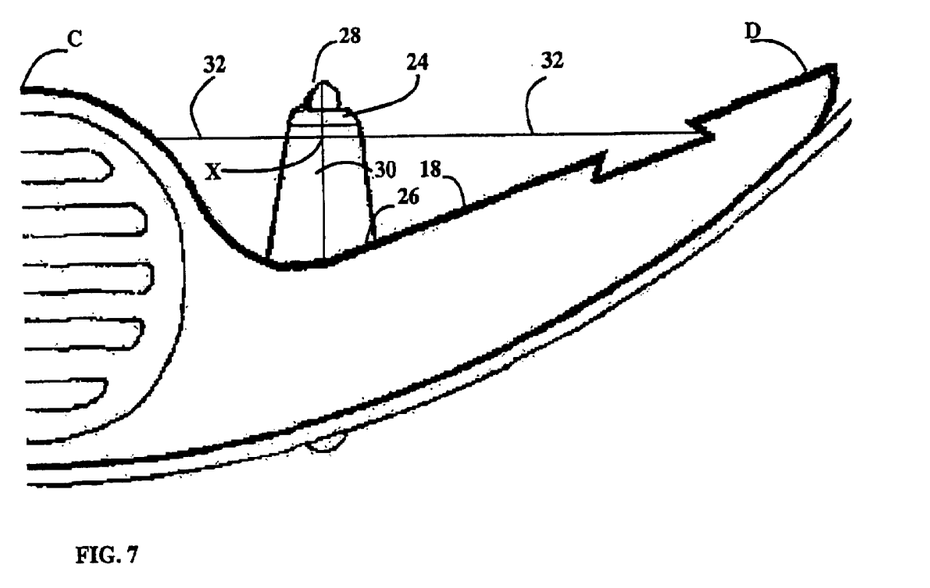
FIG. 7 is an enlarged rear view of one of the electrodes shown in FIG. 6.
Figure 8:
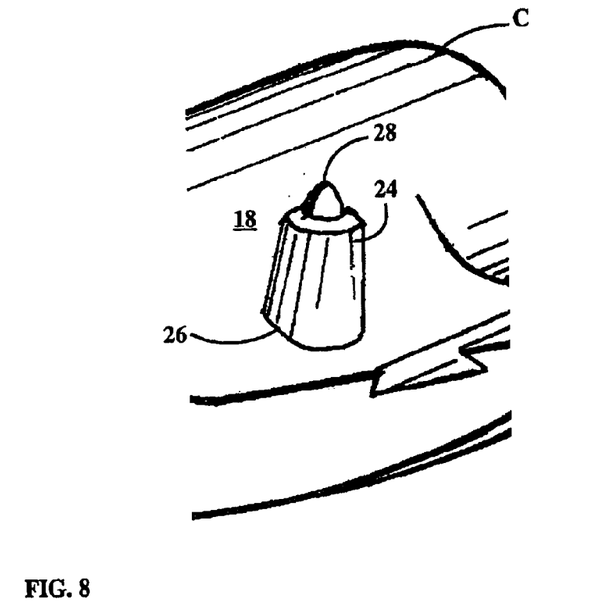
FIG. 8 is an enlarged perspective view of one of the electrodes shown in FIG. 3.

Referring specifically to FIGS. 7 and 8, electrode 24 (or sensor 90 as the case may be) has an electrode base 26 located at the intersection of inside surface 18 and electrode 24, a opposite distal tip 28 for making contact with the animal's skin 6, and a central longitudinal axis 30. As shown in FIG. 4, electrodes 24 make contact with the skin 6 of the animal at pressure points A and B when collar 10 is attached to the animal's neck.

As shown graphically in FIG. 4, inside surface 18 is designed to also make contact with the skin 6 of the animal during use, for example at high point surfaces C, D, and E. High point surfaces C, D, and E are raised portions of inside surface 18, which extend inside surface 18 above electrode base 26 and towards the animal, so as to increase contact between inside surface 18 and the animal's skin 6 and to thereby relieve and distribute the load caused by collar tension around the animal's neck over a larger contact friction area than in the typical animal collar of the prior art (see FIG. 1). This has two beneficial effects. First, animal comfort is improved and the possibility of developing sores is reduced because less pressure is concentrated on pressure points A and B. Second, collar movement is reduced due to the increased contact friction areas at high point surfaces C, D and E of inside surface 18. As a result, the collar stays in place on the animal's neck and good skin-electrode contact is maintained.

Good skin-electrode contact is further obtained and maintained by the present invention, which directs the animal's skin 6 in the neck area, which is generally relatively loose, into pockets P separating high point surfaces C, D, and E, and electrodes or sensors 24.

Referring to FIG. 7, the one or more high point surfaces C, D, E, are raised portions of inside surface 18 extending above electrode base 26 and towards the animal and are designed to intersect with a notional 90-degree plane 32 extended from any point X, above the level of electrode or sensor base 26, along central longitudinal axis 30 of electrodes or sensors 24, 90.

In the prior art collar 1 shown in FIGS. 1 and 2, inside surface 5 of collar housing 2 is flat and contains no high point surfaces that extend above an electrode or sensor base 26' toward the animal during use. In the prior art collar of FIGS. 1 and 2, there are no high point surfaces on inside surface 5 that will intersect with a notional 90-degree plane 32' extended from any point X', above the electrode or sensor base 26', along a central longitudinal axis 30' of electrodes or sensors 4. In the prior art collars, most of the collar tensioning load is concentrated on the pressure points A and B of electrodes or sensors 4.

The advantage of having one or more raised high point surfaces C, D, E, in the present invention, is that these high point surfaces relieve the pressure applied to electrode pressure points A and B and distribute the collar tensioning load over a larger contact friction area, as shown in FIG. 4, thus improving animal comfort and reducing the possibility of sores and injury. It also permits collar 10 to be secured to the animal with greater force so as to improve electrode-skin contact and minimize the possibility that the collar will shift as a result of animal movements.

The presence of one or more high point surfaces C, D, E, on inside surface 18, regardless of their number or dimensions, will improve the performance of collar 10 when compared to the prior art collar 1, where inside surface 5 is flat (see FIGS. 1 and 2). Nevertheless, it is preferred that high point surfaces C, D, E, of inside surface 18 extend as high as possible relative to electrode base 26 and are as broad as possible, while at the same time permitting adequate skin-electrode contact. As shown in FIG. 4, the animal's skin 6 must be able to extend into pockets P formed between electrodes or sensors 24 and high point surfaces C, D, E.

Figure 9:
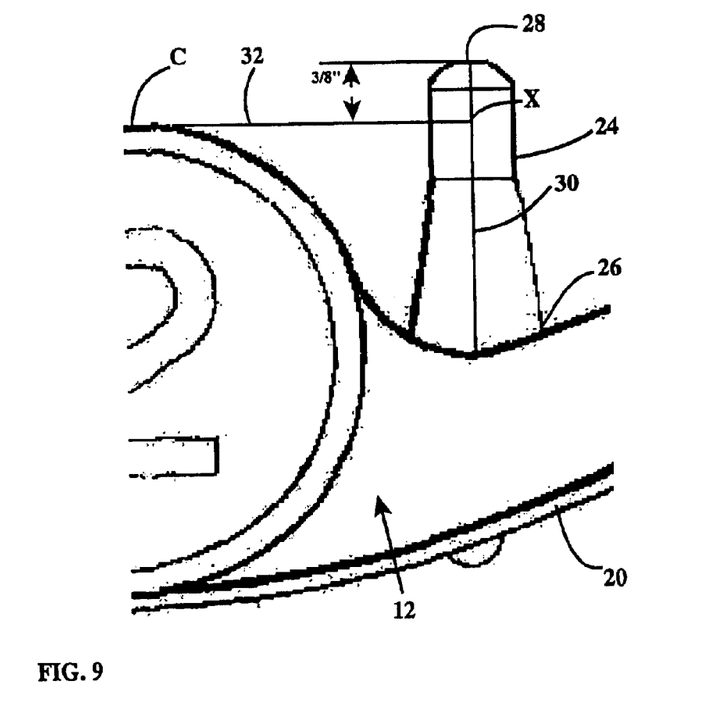
FIG. 9 is an enlarged front view of one of the electrodes of the collar of the present invention, extending above a central high point surface of the collar.

Referring to FIG. 9, the applicant has found it advantageous if collar housing 12 is designed so that the point X on longitudinal axis 30, from which notional 90-degree plane 32 is extended, is located less than $\frac{3}{8}$ inch (0.95 cm) down from distal end 28 of the one or more electrodes 24. That is, distal end 28 of electrodes 4 should not extend above high point surfaces C, D, E by more than $\frac{3}{8}$ inch (0.95 cm).

Figure 6:
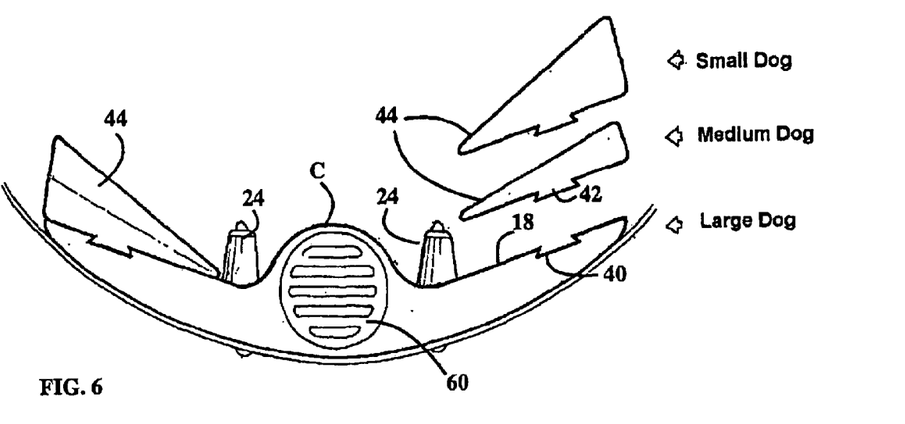
FIG. 6 is a rear view of the collar of the present invention showing the attachment of side inserts in exploded fashion.

Referring to FIGS. 3 and 6, inside surface 18 of collar housing 12 may include one or more flanged notches 40 designed to mate with oppositely flanged projections 42 on the bottom of wedge-shaped adjustment wings 44. Adjustment wings 44 can be any suitable shape and are attached to collar housing 12 to raise the effective height of high point surfaces C, D, E on inside surface 18 relative to electrodes or sensors 24, thereby increasing animal comfort when collar 10 is attached to the animal's neck. Adjustment wings 44 are used particularly when attaching collar 10 to animals having smaller radius necks. Depending on the size of the animal's neck, multiple adjustment wings 44 can be used to improve fit and comfort. Those skilled in the art will appreciate that other equivalent means of attaching adjustment wings 44 to collar housing 12 can be conceived and all such equivalent means are believed to be within the scope of the applicant's invention as described herein.

To further improve collar comfort and versatility, and to ensure good electrode-skin contact without causing discomfort or choking the animal, connecting strap 20 may include an elastic insert 50 (see FIG. 3), which automatically adjusts collar 10 to the correct tightness regardless of the user's skill in securing the collar to the animal. One significant problem with electronic animal collars of the prior art results from the cone-like shape of the animal's neck, which is thicker at the body than at the head. When attaching the collar to the animal, users tend to slide the collar down and place it near the base of the animal's neck in the hope of there being less chance of the collar shifting downward further. Unfortunately, regular electronic collars attached in this manner will shift upwards on the animal's neck, becoming lose and may slide around to the side. Elastic insert 50 automatically adjusts for the cone shape of the animal's neck to maintain the correct electrode-skin contact and prevent the collar from shifting upward to a smaller diameter area of the neck. In addition, elastic insert 50 will extend and tighten in response to the animal's movements, such as flexing the neck muscles, heavy breathing or barking, thus maintaining proper collar tension and electrode-skin contact at all times.

Figure 10:
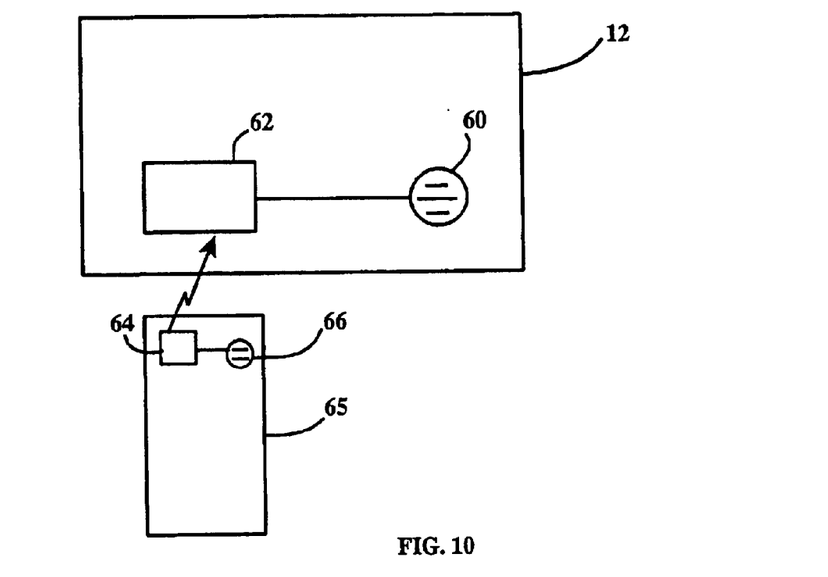
FIG. 10 is a schematic view of a further embodiment of the present invention including a receiver and a collar speaker, and a remote control unit including a microphone and a transmitter for transmitting audio commands to the animal.
Figure 11:
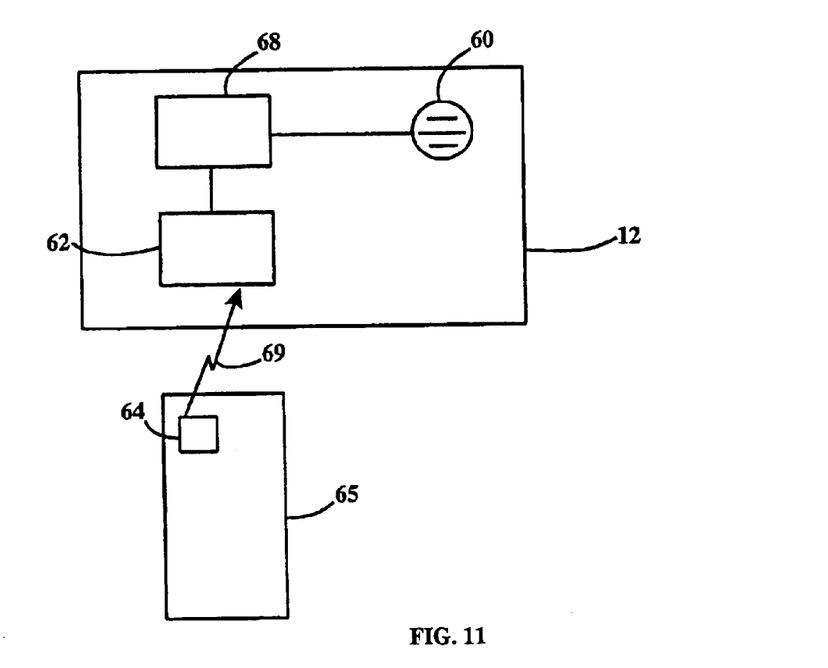
FIG. 11 is a schematic view of another embodiment of the present invention including an audio storage device for storage of audio commands.

Referring to FIGS. 6, 10 and 11, collar speaker 60 may be included within collar housing 12 for use in issuing audio commands to the animal in response to signals received from a remote transmitter 64 contained within a remote control unit 65. In one embodiment, a microphone 66 on remote control unit 65 picks up audio commands from a trainer. The commands are transmitted by transmitter 64 using permitted radio frequencies, received by receiver 62 contained within collar housing 12, and played over collar speaker 60. In an alternative preferred embodiment, as shown in FIG. 11, collar housing 12 may include audio storage device 68, such as an electronic memory chip, a micro recorder/player, or any similar device, containing pre-recorded audio commands or sounds familiar to the animal. Instead of transmitting the actual audio, the trainer uses remote control unit 65 and transmitter 64 to send an activation code 69 corresponding to one of the pre-recorded audio commands or sounds contained within audio storage device 68. Receiver unit 62 receives activation code 69 and causes the corresponding audio command or sound from storage device 68 to be played over collar speaker 60.

Figure 12:
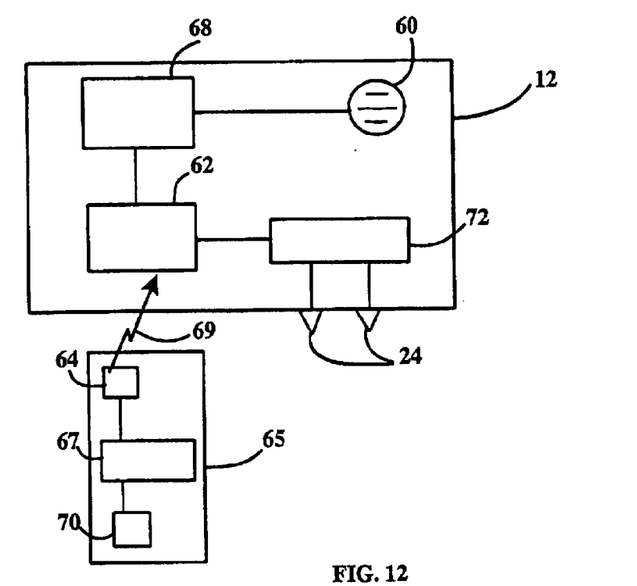
FIG. 12 is a schematic view of another embodiment of the present invention including a vibration sensor on the remote control unit.

In a further aspect of the invention, as shown in FIG. 12, the above-described stored sounds, or an electric stimulus applied through electrodes 24, can be activated simply by tapping or sharply striking remote control unit 65. As a result, remote control unit 65 can be kept in the user's pocket and need not be removed for operation. This can be advantageous, for example, when hunting with a dog in the field where it may be raining or cold and the hunter does not want to carry remote control unit 65 in his hand, or remove a glove to activate the control unit buttons. It is also a safety feature, since it can be dangerous to handle both a gun and the remote control unit at the same time.

In this aspect of the invention, as shown in FIG. 12, remote control unit 65 includes a vibration sensor 70 connected to a microprocessor 67 including memory. Vibration sensor 70 is capable of detecting when remote control unit 65 has been struck sharply or tapped by a user In response to the tap, microprocessor 67 uses transmitter 64 to send an activation code 69 to receiver 62, which initiates playback of one of the stored audio commands or sounds, or causes an electric stimulus to be sent from stimulating unit 72 to the animal through electrodes 24. Vibration sensor 70 may be any suitable device capable of detecting vibrations produced by a sharp strike or tap of remote control unit 65, such as an accelerometer, a piezoelectric crystal, or any device which measures strain wave propagation.

Microprocessor 67 can be programmed to send the appropriate activation code 69 for audio playback, or electric stimulus, depending on the number and sequence of taps detected by vibration sensor 70. Remote control unit 65 may also include a means to prevent sending the activation code 69 upon accidental activation. For example, after detecting a tap, remote control unit 65 can be configured to issue a confirmatory signal, such as a sound tone or a voice reply or a vibration that the user can feel. Activation code 69 will not be sent until the user replies to the confirmatory signal with one or more taps within a specified period.

Figure 13:
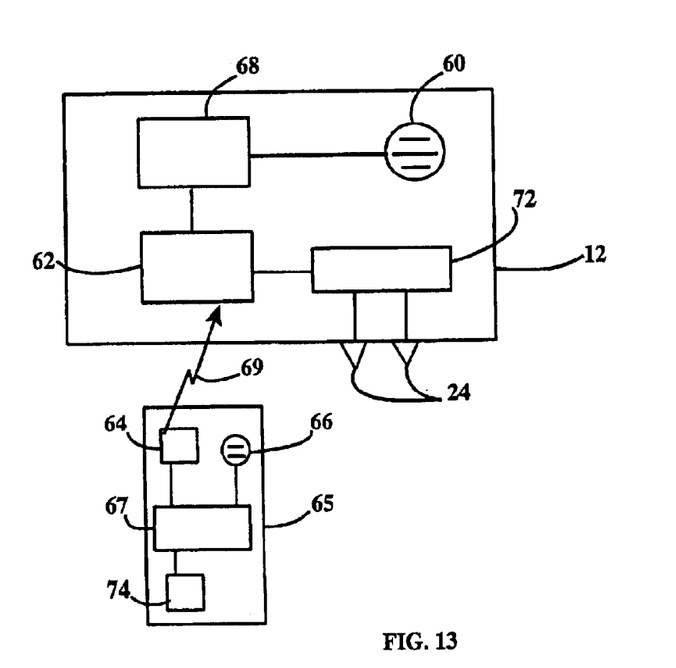
FIG. 13 is a schematic view of another embodiment of the present invention including voice recognition circuits and a microphone on the remote control unit.

In an alternate embodiment of this aspect of the invention, as shown in FIG. 13, vibration sensor 70 is replaced with voice recognition circuits 74 and microphone 66. Upon receipt of the correct voice commands from the user the corresponding activation code 69 is sent to receiver 62, which initiates playback of one of the stored audio commands or sounds or causes an electric stimulus to be sent from stimulating unit 72 to the animal through electrodes 24.

Figure 14:
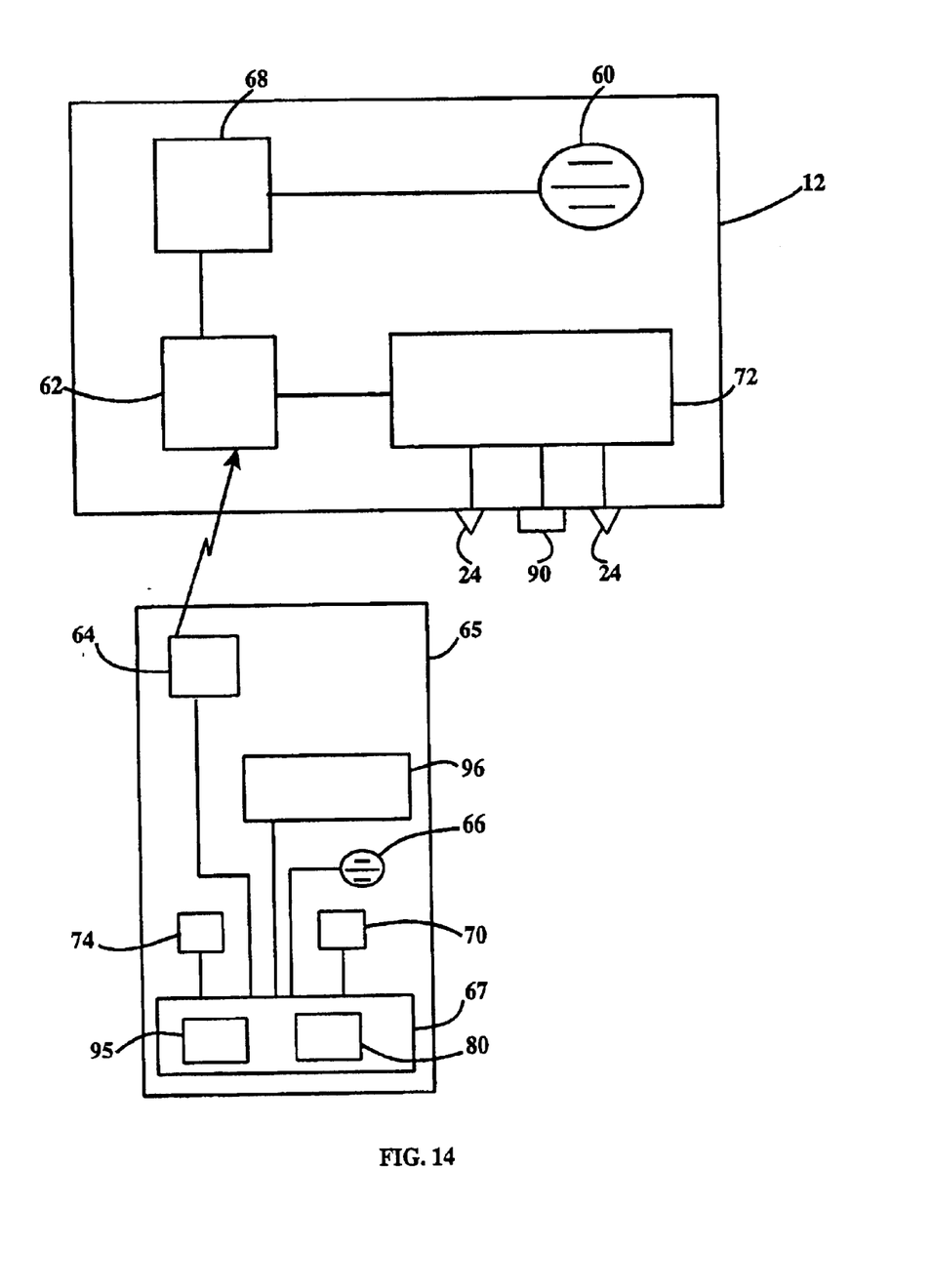
FIG. 14 is a schematic view of another embodiment of the present invention including an option control program and an advertising program on a microprocessor of the remote control unit.

In a further aspect of the invention, as shown in FIG. 14, remote control unit 65 includes microprocessor 67 having an option control program 80, which can be used to activate or deactivate features and components of collar 10 and remote control unit 65. In this aspect of the invention, collar 10 and remote control unit 65 can be manufactured to include all of the features and components describe above, including bark sensor 90, collar speaker 60, receiver 62, audio storage device 68, stimulating unit 72, electrodes 24, vibration sensor 70, microphone 66, and voice recognition circuits 74. Due to economies of scale, manufacturing large numbers of collars 10 and remote control units 65 containing all of these components can be cost effective when compared to manufacturing smaller numbers of the devices containing differing combinations of components. At the time of purchase, the user simply identifies the desired features and pays the corresponding fee. The vendor enters an option code into remote control unit 65 corresponding to the desired features, and option control program 80 activates the corresponding components and controlling circuitry. The option code could be determined, for example, by the serial number of remote control unit 65 so that no two collars would have the same option code for the same features. For example, initially the user may not wish to purchase the no-bark feature of the collar, but may want to have the ability to control the collar by tapping remote control unit 65 or using voice commands. In this scenario, the vendor enters an option code into remote control unit 65 to active vibration sensor 70 or voice recognition circuits 74 (or both) permitting the user to control the collar by tapping remote control unit 65 or with voice commands.

One significant advantage of this aspect of the invention is that it gives the user considerable flexibility in his purchase. New features can be added by a user at any time by paying the appropriate fee and requesting the corresponding option code. In the above scenario, the user may later decide to add the no-bark feature by requesting and paying for the corresponding option code. The option code is entered into remote control unit 65 and transmitted to collar 10 to activate bark sensor 90. To add further convenience, the option code may be provided to the user by telephone or over the Internet once payment is confirmed. One further advantage of this aspect of the applicant's invention is that a vendor no longer has to maintain an inventory of collars having different features and components. The vendor simply stocks one collar at the lowest price. If additional features are sold, the appropriate option codes are entered and additional fees are collected from the purchaser and paid to the manufacturer.

In another aspect of the invention, as shown in FIG. 14 as well, microprocessor 67 includes an advertising option program 95 and remote control unit 65 includes a display 96 for displaying advertising corresponding to the particular vendor selling the collar. Advertising option program 95 may be configured to cause certain advertising to appear in display 96 at a predetermined time or upon use of a selected feature. For example, at the beginning of duck hunting season, advertising option program 95 can cause the display of a coupon offering a discount on duck hunting products. The type of advertising displayed will be unique to each vendor and will be stored in the memory of microprocessor 67 at the time of manufacturer. At the time of shipping to a vendor, an advertising option code corresponding to that vendor is entered into microprocessor 67 to select the corresponding advertising for that vendor.

It will be appreciated by those skilled in the art that it is possible to design various configurations of the collar described herein that increase the contact friction areas between the collar and the animal, while at the same time maintaining good electrode-skin contact. Various such configurations have been illustrated herein by the applicant, but other such designs, that fall within the scope of the present invention, as herein described by the applicant, are possible. It is therefore likely that the invention may be embodied in other specific forms without departing from the spirit or essential characteristics of the invention. The present embodiments are to be considered as illustrative and not restrictive, the scope of the invention being indicated by the appended claims rather than by the foregoing description, and all changes that come within the meaning and range of equivalency of the claims are therefore intended to be embraced therein.

I claim:

1. An animal collar designed for attachment to an animal comprising:
   a collar housing having an inside surface directed toward the animal during use; and
   at least one electrode intersecting said inside surface at an electrode base and extending toward the animal during use;
   said inside surface having at least one high point surface extending above said electrode base and toward the animal during use.

2. The animal collar according to claim 1, including one or more adjustment wings attachable to said inside surface for extending said inside surface above said electrode base toward the animal during use.

3. The animal collar according to claim 1, having two said electrodes and wherein said at least one high point surface is located between said two electrodes.

4. The animal collar according to claim 1, wherein said at least one electrode has a distal end opposite said electrode base and extending toward the animal during use, and wherein said distal end is no more than ⅜ inch (0.95 cm) closer to the animal during use than said at least one high point surface.

5. The animal collar according to claim 1, wherein said collar housing is connected to a connecting strap adapted for attaching said collar to the animal.

6. The animal collar according to claim 5, wherein said connecting strap includes an elastic portion for automatically adjusting collar tension during use.

7. The animal collar according to claim 1, wherein said collar housing contains a receiver unit for receiving remote signals, and a stimulating unit for generating an electric stimulus for delivery through said at least one electrode upon receipt of said remote signals.

8. The animal collar according to claim 7, wherein said collar housing further includes a speaker and an audio storage device for issuing pre-recorded audio commands to the animal in response to said remote signals.

9. The animal collar according to claim 7, including a remote control unit comprising a transmitter, a vibration sensor, and a microprocessor, said vibration sensor adapted to detect when said remote control unit has been tapped sharply and said microprocessor adapted to use said transmitter to send said remote signals to said receiver in response to said sharp tap.

10. The animal collar according to claim 9, wherein said microprocessor includes a confirmation means adapted to initiate a confirmatory signal when said vibration sensor detects that said remote control unit has been tapped sharply.

11. The animal collar according to claim 7, including a remote control unit comprising a transmitter, voice recognition circuits, and a microprocessor, said voice recognition circuits adapted to receive and interpret voice commands from a user, and said microprocessor adapted to use said transmitter to send said remote signals to said receiver in response to said voice commands.

12. The animal collar according to claim 9, wherein said collar additionally includes a speaker and an audio storage device for issuing pre-recorded audio commands to the animal in response to said remote signals, and a bark sensor for detecting when the animal barks, and said remote control unit includes voice recognition circuits adapted to receive and interpret voice commands from a user, said microprocessor adapted to use said transmitter to send said remote signals to said receiver in response to said voice commands, said remote control unit including an option control program designed to activate or deactivate said vibration sensor, said voice recognition circuits, said audio storage device, and said bark sensor upon entry of an option code.

13. The animal collar according to claim 1, including a remote control unit for sending electronic signals to said collar, said remote control unit including a display and an advertising option program, said advertising option program adapted for displaying advertising on said display.

14. The animal collar according to claim 13, wherein said advertising to be displayed on said display is selected from a predetermined list of advertising contained within said remote control unit upon entry of an advertising code into said remote control unit.

15. The animal collar according to claim 1, including a remote control unit, said animal collar and said remote control unit including one or more optional features, said remote control unit including an option control program designed to activate or deactivate said one or more optional features upon entry of an option code.

16. An animal collar designed for attachment to an animal having a stimulating unit for generating a stimulus, and one or more electrodes for transferring the stimulus to the animal, the collar comprising:
    a collar housing for containing the stimulating unit;
    said collar housing having an inside surface designed for contacting the skin of the animal during use, each of the one or more electrodes intersecting said inside surface at an electrode base and extending toward the animal during use;
    said inside surface having at least one high point surface extending above said electrode base and toward the animal during use.

17. An animal collar designed for attachment to an animal comprising:
    A collar housing having an inside surface designed for contacting the skin of the animal during use; and
    At least one electrode intersecting said inside surface at an electrode base, said at least one electrode having a central longitudinal axis extending toward the animal during use from said electrode base to an opposite distal end;
    Said inside surface having at least one high point surface designed to intersect with a notional 90-degree plane extended from a point on said central longitudinal axis.

18. The animal collar according to claim 17, wherein said point on said central longitudinal axis is located less than ⅜ inch (0.95 cm) from said distal end of said at least one electrode.

* * * * *